United States Patent [19]
Pierson

[11] Patent Number: 5,965,020
[45] Date of Patent: Oct. 12, 1999

[54] ENDLESS BELT FILTER

[75] Inventor: Henri Gerhard Willem Pierson, Canary Island, Spain

[73] Assignee: D & C Limited, Monrovia, Liberia

[21] Appl. No.: 09/067,955

[22] Filed: Apr. 29, 1998

[30]     Foreign Application Priority Data

May 6, 1997 [GB]   United Kingdom ............... 9709169

[51] Int. Cl.⁶ ............................. B01L 33/04; B01L 33/74
[52] U.S. Cl. ....................... 210/385; 210/401; 210/406
[58] Field of Search ................................ 210/385, 388, 210/400, 401, 406, 416.1

[56]          References Cited

U.S. PATENT DOCUMENTS

| | | | |
|---|---|---|---|
| 4,153,550 | 5/1979 | Lautrette | 210/401 |
| 4,265,765 | 5/1981 | Gallottini | 210/401 |
| 4,285,815 | 8/1981 | Gallottini | 210/406 |
| 4,338,193 | 7/1982 | Lautratte et al. | 210/401 |
| 4,595,501 | 6/1986 | Queyroix | 210/400 |

FOREIGN PATENT DOCUMENTS

| | | |
|---|---|---|
| 511710A1 | 11/1992 | European Pat. Off. . |
| 688592A1 | 12/1995 | European Pat. Off. . |
| 2132967A | 7/1984 | United Kingdom . |
| 2240820A | 8/1991 | United Kingdom . |

*Primary Examiner*—Christopher Upton
*Attorney, Agent, or Firm*—Dennison, Meserole, Scheiner & Schultz

[57]          ABSTRACT

An endless belt filter for separating liquids and solids from a mixture comprises a liquid-permeable filter belt below the upper run of which is positioned at least one suction tray moveable in the direction of the upper run of the belt, at least one hollow, elongate vacuum rail below the suction trays extending the length of the upper run of the belt, the suction trays seating on the vacuum rail to be guided thereby in their longitudinal movement therealong, and a vacuum source connected to the hollow interior of the vacuum rail, the trays including one or more apertures communicating into the hollow interior of the vacuum rail whereby an under pressure is applied to the trays by the vacuum source to draw liquid from the trays into the vacuum rail. The trays are supported by a pneumatic cushion.

15 Claims, 9 Drawing Sheets

Fig. 17

ENDLESS BELT FILTER

BACKGROUND OF THE INVENTION

This invention relates to endless belt filters, and more particularly to such filters for separating liquids and solids from a mixture.

Endless belt filters commonly comprise an endless belt of permeable material onto the upper run of which is fed the mixture to be separated. At least one suction tray is located beneath the upper run of the belt to move along with the belt and to receive therein liquid from the mixture that passes through the belt, a vacuum applied to the suction tray serving to draw the liquid from the suction tray for subsequent disposal thereof.

Heretofore it has been common practice to interconnect the vacuum source with the suction trays by means of flexible hoses to accommodate the relative movement between the source and the trays. However, the use of such hoses invariably imposes undesirable restrictions upon, for example, the temperature of the products, the volume of the products and the range of the products that can be safely handled by the filter arrangement, as well as imposing undesirable physical forces on the trays themselves.

It has been proposed, for example in EP-A-0511710, to utilise a telescopic connection between the vacuum source and the suction trays, which overcomes some of the aforementioned restrictions. However, such an arrangement introduces further problems in that, under vacuum conditions, there is a tendency for the telescopic connection to close itself thereby imposing further substantial and undesirable sideways forces on the suction tray.

Additionally, such a system must of necessity incorporate extremely well-fitting seals to maintain a sealed system. The relatively high temperate under which the filters can operate, together with the aggressive nature of the mixtures being handled, which often causes crystallisation, will inevitably serve to cause ongoing deterioration in the seals.

It has also been proposed, for example in EP-A-0688592, to provide, along one or both sides of the belt, a stationary suction box incorporating a slot in which the or each movable suction tray slides. Again, such an arrangement will require extremely accurate engineering to ensure continuous sealing between the or each stationary suction box and the movable suction trays, particularly bearing in mind that the former are typically up to 20 meters long.

SUMMARY OF THE INVENTION

It would be desirable to be able to provide an endless belt filter of the above type in which the connection between the vacuum source and the suction trays is such as to overcome the disadvantages of the prior art, is of relatively simple construction and is such as to ensure an effective and continuous seal between the vacuum source and the suction trays under all working conditions.

According to the present invention, there is provided an endless belt filter for separating liquids and solids from a mixture, comprising a liquid-permeable, driven filter belt, at least one suction tray below the upper run of said belt to be movable in the direction of the belt, the at least one tray incorporating an elongate slide member on its underside extending the length of the tray, an elongate vacuum rail below the at least one suction tray and extending substantially the length of the upper run of the endless belt, said vacuum rail receiving thereon the slide member of the at least one tray whereby said tray seats on, to be guided in its longitudinal movement by, said vacuum rail, and a vacuum source connected to the vacuum rail, at least one aperture extending through the at least one tray and through the associated slide member to communicate with the vacuum rail whereby an under pressure is applied to the at least one tray by the vacuum source to draw liquid from said tray into the vacuum rail, the underside of the at least one tray to each side of the vacuum rail being supported by a pneumatic cushion.

It will be appreciated that, with such an arrangement, the vacuum rail acts both as a vacuum connection to the trays and as a guide rail for the longitudinal movement of the trays, thus providing a simple and reliable method of connecting the trays to the vacuum source.

The vacuum rail is symmetrically positioned with respect to the width of the trays, and, as there is very little contact between the rail and the trays, there is minimum friction therebetween, such friction as there is being central of the trays with no off-centre forces being applied thereto.

The provision of the air cushions to support the trays results in the trays effectively floating along the vacuum rail, thereby further reducing friction and requiring relatively low longitudinal forces to move the trays.

In one embodiment of the invention, the vacuum rail is hollow and is of triangular shape in transverse section with a horizontal base, the slide member on the at least one tray comprising a slide block with an inverted V-shaped recess in its undersurface to seat on and to co-operate with the vacuum rail.

Preferably, the at least one tray has a plurality of longitudinally spaced apertures therein each extending through the base of the tray and through the slide block, the apex of the recess in the at least one slide block having a longitudinal slot therein which interconnects the apertures therethrough, the vacuum rail having a plurality of longitudinally spaced apertures therethrough communicating into the interior of the rail, the arrangement being such that the vacuum source produces an underpressure in the trays by way of the apertures in the rail, the slot in the at least one slide block and the apertures in said tray.

In an alternative embodiment of the invention, the slide member on the at least one tray is hollow and is of V-shape in transverse section, the vacuum rail having a V-shaped recess in its upper surface extending the length thereof to receive therein the slide member on the at least one tray.

Preferably the at least one tray has a plurality of longitudinally spaced apertures therein each extending through the base of the tray to communicate into the hollow slide member, the base of the slide member having a plurality of further longitudinally spaced apertures therein, the base of the recess in the vacuum rail having a longitudinal slot therein to which the vacuum source is applied, the arrangement being such that the vacuum source produces an under pressure in said tray by way of the slot in the rail, the further apertures in said slide member and the apertures in said tray.

The filter may comprise a plurality of elongate vacuum rails below the at least one suction tray, said tray including a plurality of slide members, one to seat on each vacuum rail.

The trays may be interconnected with one another, for example by bolting or welding, to constitute a unit which, on reaching the forward end of the upper run of the belt, is returned to a starting position adjacent the rear end of the upper run of the belt.

Any one of a variety of tray return arrangements may be provided, which may be, for example, pneumatically or hydraulically operated, or a pulley system.

The vacuum source may be such that, on activation, the filter belt is sucked onto the trays whereby the trays are carried along by the filter belt to the forward end of the upper run thereof, the vacuum source then being deactivated to enable return of the trays to their starting positions.

Alternatively separate drive means may be provided for moving the trays forwards with the filter belt, which means may be, for example, a pulley system. Said system may also be used to return the trays to their starting position.

Alternatively there may be a plurality of independent suction trays which, when they reach the forward end of the upper run of the belt, are each returned by a transport system to a starting position adjacent the rear end of the upper run of the belt.

Such an arrangement enables the filter belt to be moved continuously without the need for flexible carrier belts or support belts of any kind, and eliminates intermittent movement of the suction trays. The foremost trays can be returned to their starting positions at the rear end of the filter belt as the following trays move with the filter belt towards the forward end thereof, thus providing continuous circulation of the trays and continuous circulation of the filter belt.

The transport system may comprise a return mechanism below the upper run of the filter belt and moving in a direction opposite to that of said upper run, each tray, on reaching the forward end of the upper run of the filter belt, falling onto the return mechanism, the transport system further comprising a lifting mechanism which raises the trays from the return mechanism and into their starting positions adjacent and below the rear end of the upper run of the filter belt.

Preferably the transport system includes a pivotal transfer mechanism onto which each tray slides under gravity on reaching the forward end of the upper run of the filter belt, the tray subsequently sliding from said transfer mechanism under gravity onto the return mechanism.

The return mechanism may comprise an air slide in the form of a hollow, elongate rail from which emanate a plurality of inclined jets of air under pressure which serve to propel the trays therealong from the transfer mechanism to the lifting mechanism.

In a preferred embodiment of the invention, the individual trays abut one another and are held against the filter belt by the under-pressure applied to the trays by the vacuum source to be carried along by the filter belt, gaskets reacting between adjacently abutting ends of the trays.

One end wall of each tray may be provided with a plurality of holes therein, and the other end wall of each tray may carry a gasket thereon, the under-pressure in a tray serving to suck the gasket on the other end wall of the adjacent tray against the one end wall thereof by way of the holes in said one end wall.

DESCRIPTION OF THE PREFERRED EMBODIMENTS

Referring to FIGS. 1 to 10, the belt filter comprises an endless belt 2 of permeable cloth material driven by a roller 4 and passing under a scraper 6, through a cloth wash box 8, over tensioning rollers 10,12, over a guide roller 14 and under a roller 16. The sides of the filter cloth 2 lie against support boxes 18 to each side of the device.

Figure 1:
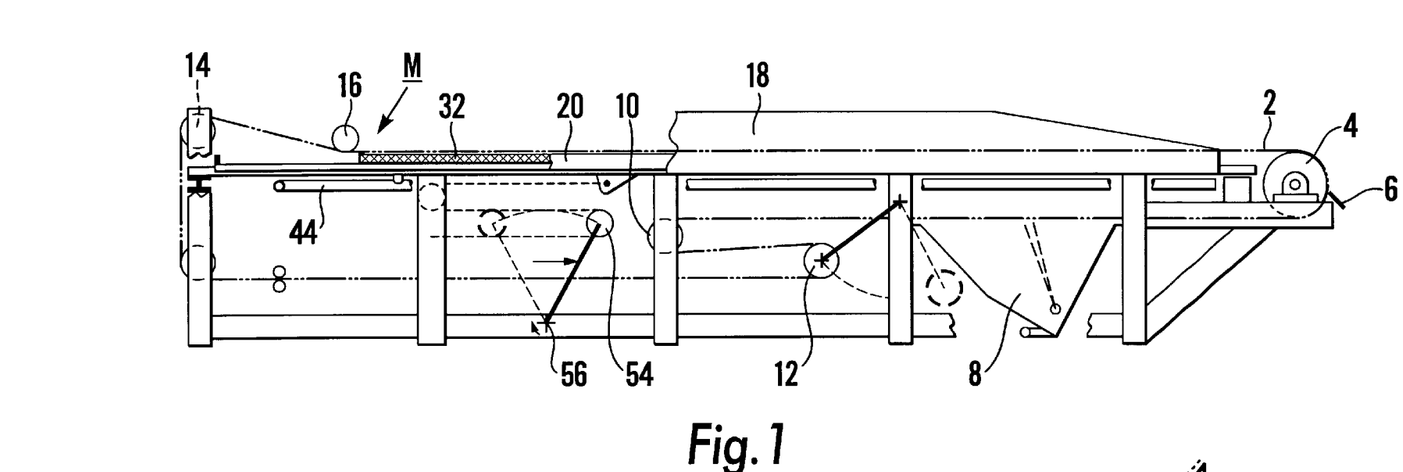
FIG. 1 is a side view of one embodiment of a belt filter according to the invention.
Figure 9:
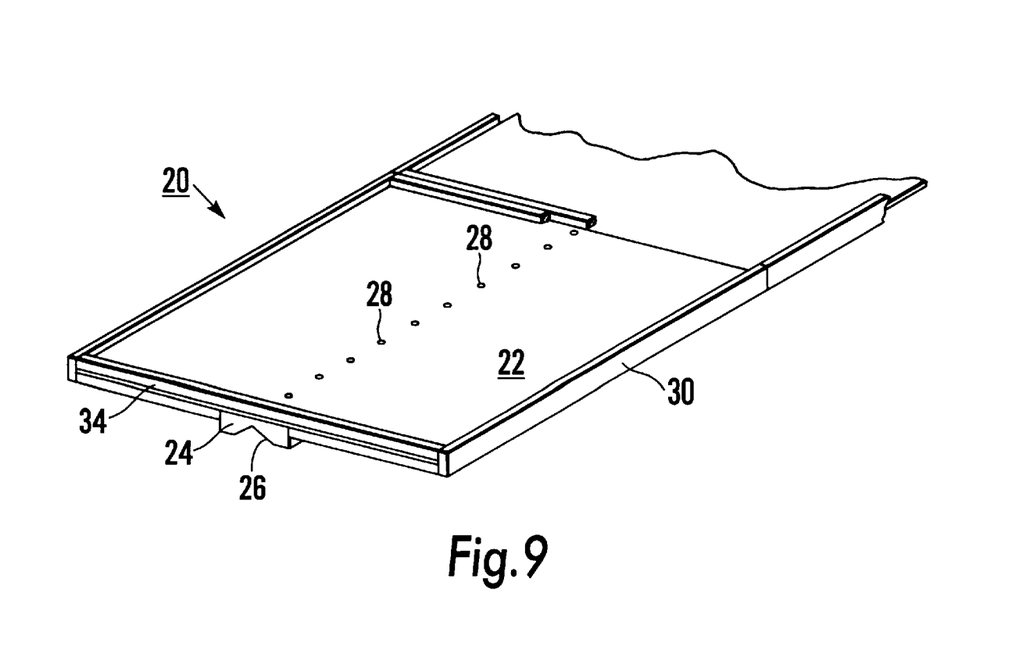
FIG. 9 is a perspective view of a suction tray of a filter of the invention.

Below the upper run of the belt 2 are a plurality of interconnected suction trays 20, each tray having a base 22 of thin sheet material, typically polypropylene.

Figure 5:
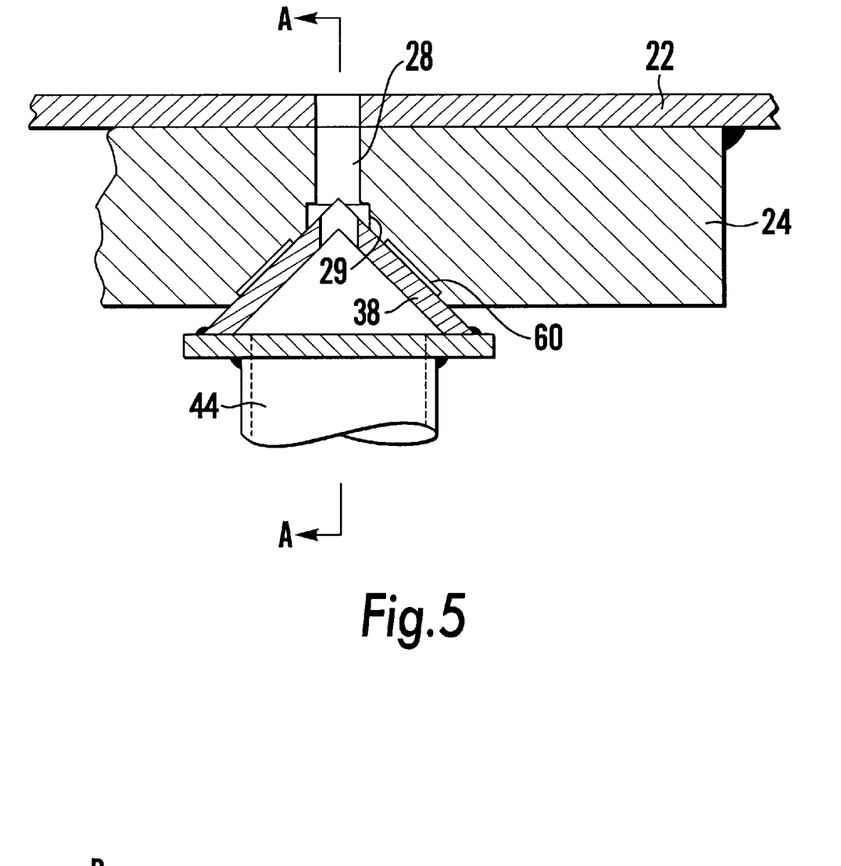
FIG. 5 is an enlarged transverse section of part of the section of FIG. 4.

Welded to the underside of the base 22 of each tray is a slide block 24 located centrally of the tray 20 and extending the length thereof, the slide block 24 being of, for example, polypropylene, high density polyethylene or the like.

Figure 6:
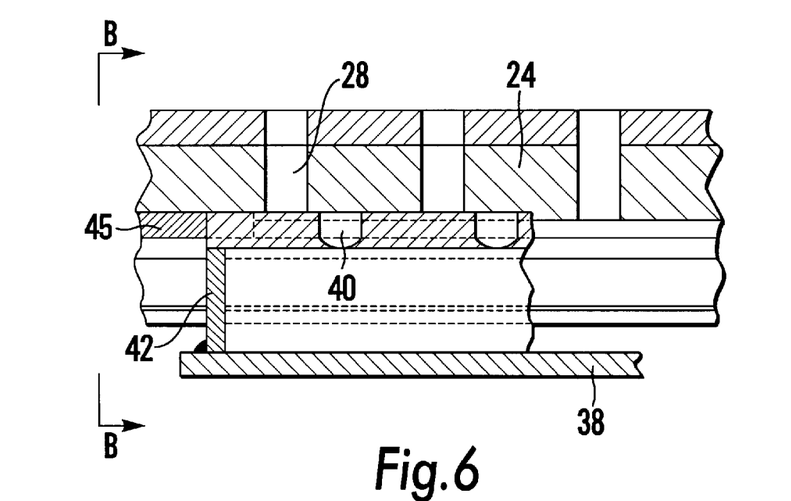
FIG. 6 is a longitudinal section on the line A—A in FIG. 5.
Figure 7:
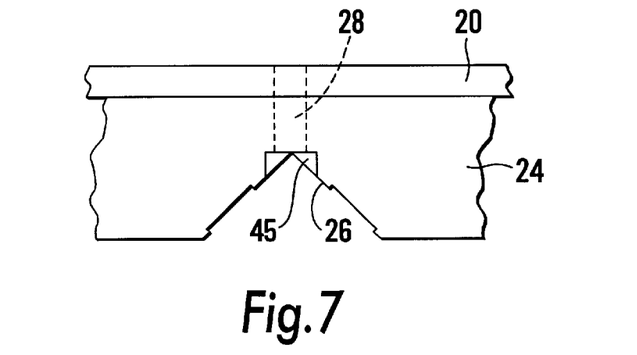
FIG. 7 is an end view of the slide block in the direction B—B in FIG. 6.

An inverted V-shaped groove 26 is formed centrally in each slide block 24 to extend the length thereof, a plurality of holes 28 being drilled through the base 22 of the tray and through the slide block 24 to communicate into the groove 26. The holes 28 are typically of 10 mm diameter and on a 40 mm pitch. A rectangular section groove 29 is formed along the apex of the groove 26 to extend the length of the block 24 and to interconnect the holes 28, again for reasons which will become apparent.

Figure 4:
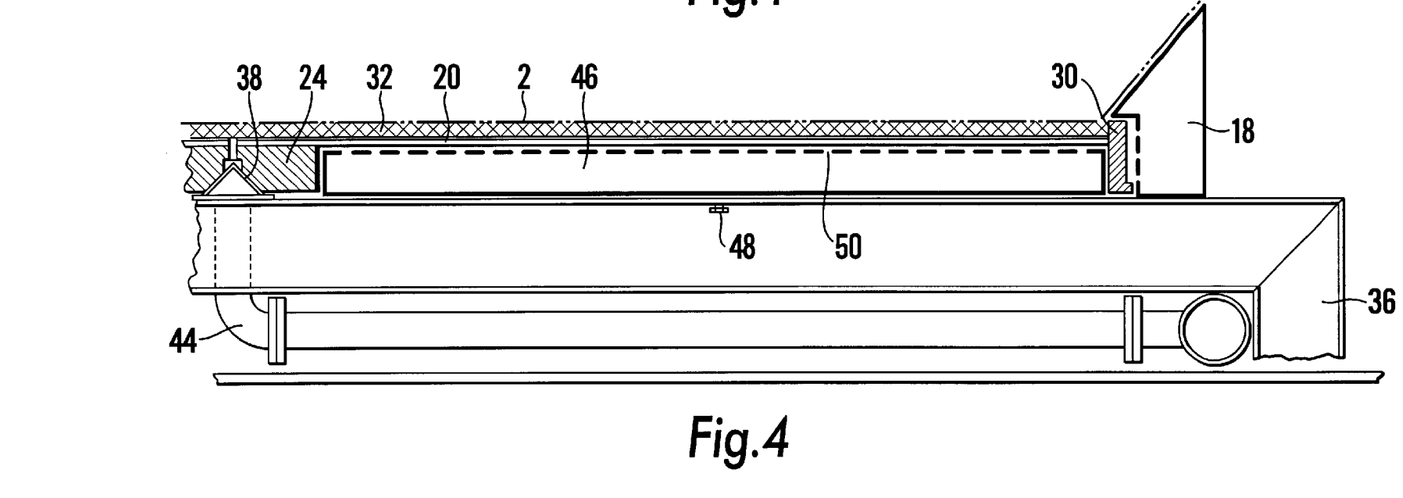
FIG. 4 is a transverse section through part of a filter according to the invention.

Walls 30 extend along opposed sides of the tray 20 to extend above the tray 20 to the level of a drainage grid 32 (not shown in detail) and to extend below the tray 20 by about 40 mm for reasons which will become apparent.

Similar walls 34 extend along opposed ends of the tray 20.

Individual trays 20 may be bolted together or be welded together on site to form a unit, the construction of the trays being such that said unit is of relatively light weight and therefore easily manipulated.

Mounted to the framework 36 of the filter is a hollow vacuum rail 38 which extends centrally the length of the filter. The rail 38 is of triangular cross section, typically comprising an angle iron welded to a bottom plate. A plurality of holes 40 are drilled in the apex of the rail 38, these holes, as in the trays 20, being typically of 10 mm diameter on a 40 mm pitch.

Figure 8:
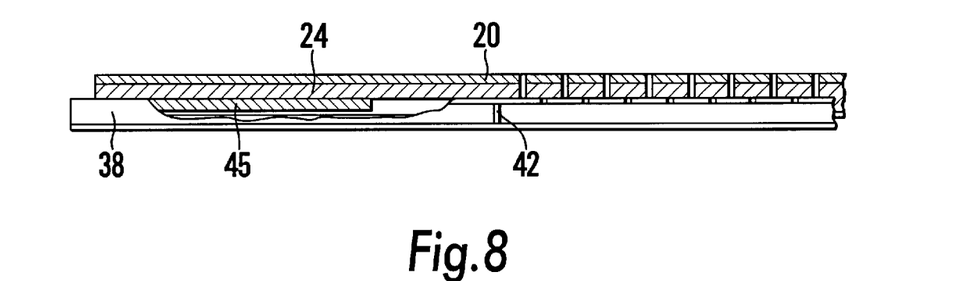
FIG. 8 is a side view, partly in longitudinal section, of the end extent of the trays/vacuum rail.

The ends of the rail 38 are closed off with plates 42, while a vacuum source is connected to the interior of the rail 38 through a pipe 44.

The slide blocks 24 of the trays 20 seat on the vacuum rail 38 in a substantially airtight manner whereby the vacuum source is in communication with the hollow interior of the trays 20 by way of the pipe 44, holes 40, groove 29 and holes 28. To prevent vacuum loss at the front and rear end of the tray unit, the open ends of the rectangular section groove 29 in the front and rear slide blocks 24 are closed by means of closely fitting V-grooved plugs 45 shown in FIGS. 6 to 8.

As shown in FIG. 8, the rear extent of the vacuum rail 38 is not perforated, but merely serves to support the endmost run of the trays 20 which, for the first 500 mm or so, have no holes therein.

The transverse extents of the trays 20 to each side of the vacuum rail 38 are supported by an air cushion emanating from air cushion boxes 46 mounted on the framework 36 by means of adjustable screws 48. The boxes 46 have perforated surfaces 50 and can be manufactured from a variety of materials because of the low pressures—typically 0.02 Bar—involved. Such pressures adequately support the trays 20 together with the drainage grid 32 and the filter cake, and result in the trays 20 moving in a substantially frictionless manner.

To ensure that the trays 20 do not touch the sides of the device, the filter cloth support boxes 18 have perforated sides and, as well as centering the trays 20, act as air cushions for the trays 20. The filter cloth 2 is wider than the trays 20, and, as mentioned above, seats on the support boxes 18.

Figure 2:
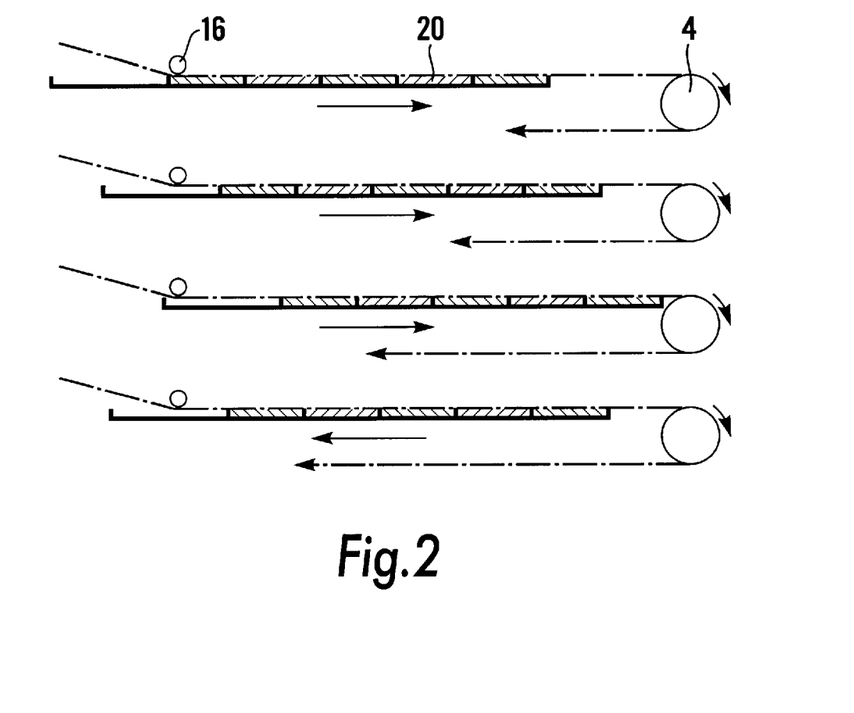
FIG. 2 is a schematic diagram showing operation of the filter of FIG. 1.
Figure 3A:
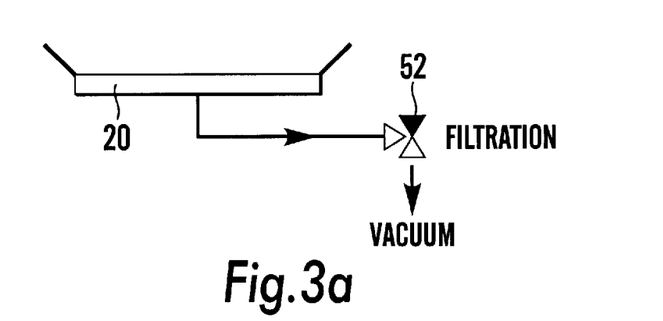
FIG. 3 illustrates operation of the vacuum source to suction trays of the filter of FIG. 1.
Figure 3B:
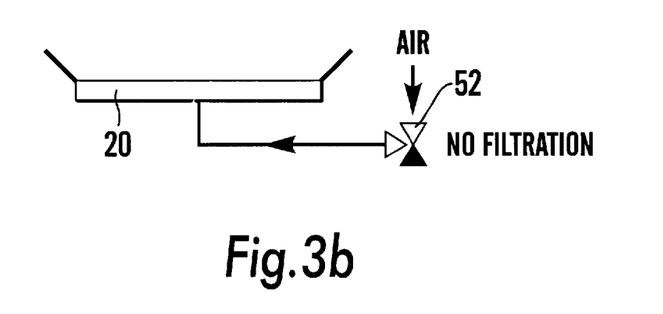

Referring to FIGS. 2 and 3, the belt filter operates as follows. The filter cloth 2 moves continuously and the mixture to be separated is fed continuously onto the cloth 2 at point M. The vacuum source is actuated and produces an under pressure in the interior of the trays 20 whereby the filter cloth is drawn onto the trays 20. Thus the trays 20 are pulled along with the filter cloth 2.

When the forward end of the trays 20 reaches the drive roller 4, the vacuum is switched off by the three-way valve 52, and the trays 20 are returned to their starting point below the rear end of the upper run of the belt 2.

This return of the trays 20 can be achieved in a variety of ways, for example by means of a directly coupled pneumatic or hydraulic cylinder, by a ratchet arrangement, by a cam arrangement, or by a pulley arrangement as shown in FIG. 1.

The pulley arrangement is referenced 54,56 and makes for easy adjustment of the tray movement and enables the use of a small degree of turning at point 56 since one or more 'gearings' can be incorporated. As shown, there is a 50% gearing. In the case of a totally enclosed filter, the output of shaft 56 can extend outside the housing through a simple seal.

In belt filters incorporating very light weight filter cloth 2, it may be advantageous and/or necessary to pull the trays forwards mechanically rather than relying upon the vacuum/ filter cloth arrangement detailed above.

Figure 10:
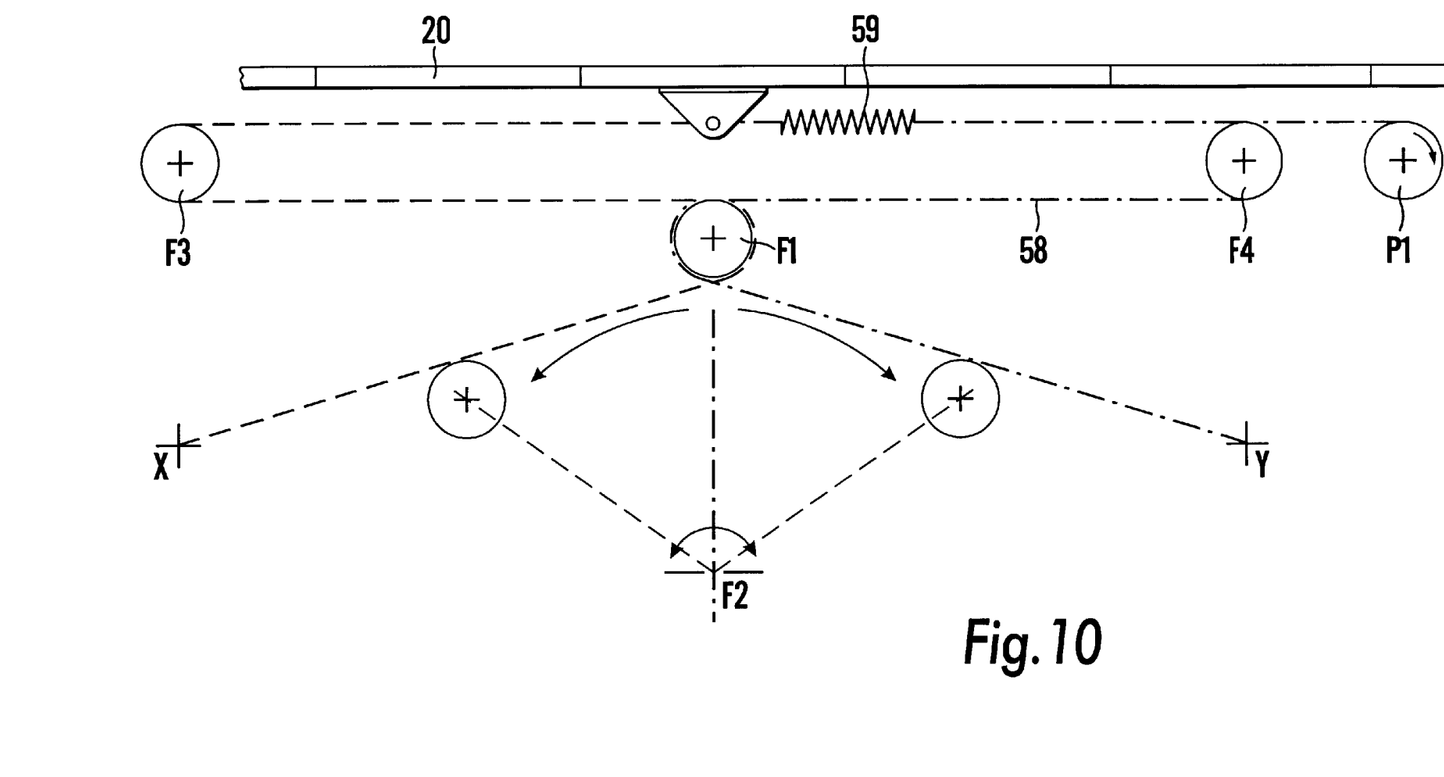
FIG. 10 shows a pulley arrangement for moving the trays of a filter according to the invention.

A suitable system is shown in FIG. 10 in which the pulleys F3 and F4 are fixed and pulley F1 is moveable either through an arc centered at F2 or linearly to the approximate positions shown in dotted lines.

A drive belt 58 has its two ends fixed at X and Y and extends around the pulleys F1,F3,F4 as shown.

When F1 is moved to the left hand side as viewed in the drawing, the trays 20 move forwards to the right, and vice versa.

To compensate for the difference in track length resulting from the triangulation of the pulleys, a spring 59 or like extension device may be incorporated in the drive belt 58.

As an alternative to the moveable pulley F1, a driven pulley P1 may be provided fitted with, for example, an air motor which engages to move the trays 20 forwards, winding the associated cable onto its drum, and disengages when the trays 20 are pulled back, allowing the cable to be paid out from the drum.

Clearly any other suitable drive arrangement could be used.

The described system has a number of distinct advantages over known systems.

The vacuum rail 38 acts both as a vacuum connection to the trays 20 and a guide rail for movement of the trays 20, the connection between the vacuum source and the trays 20 being both simple and reliable.

As there is very little contact between the slide blocks 24 of the trays 20 and the vacuum rail 38, there is almost no friction between these components, such friction as there is lying centrally of the trays 20 with no off-centre forces being applied to the trays 20. In the case of a wide filter, a plurality of parallel equi-spaced rails can be used.

Lubrication grooves 60 can be provided in the slide blocks 24 to enable lubrication of the vacuum rail to be effected.

As the trays 20 are neither running on or with wheels, and as they are not sliding either, but floating as a result of the provision of the air cushions, there is almost no resistance to movement. Thus an appreciably lower force than heretofore is required to return the trays 20 to their starting positions, and faster movement is possible.

As they float, the construction of the trays 20 themselves can be relatively simple, the necessary dimensional stability and rigidity required in existing arrangements, which is a major problem in particular with thermoplastics material, being completely avoided.

Referring to FIGS. 11 to 16, there is shown a further embodiment of the invention which operates substantially as detailed above, but in which the trays 20 are separate from one another for independent movement relative to one another. Components corresponding with those of the embodiment of FIGS. 1 to 10 are similarly referenced.

The trays 20 lie head to tail without any interconnection therebetween, the filter operating as follows with particular reference to FIGS. 11 and 12.

The belt 2 travels around a series of rollers in the conventional manner with the belt being driven continuously by roller 4. Cake is discharged at the point of the drive roller 4 with a deflecting knife 6 or similar scraper, and the cloth is washed in a washbox 8.

The suction trays 20 rest on the vacuum rail 38 and air cushion support, and are carried along by the belt 2 by virtue of vacuum suction.

When the trays 20 reach the end of the rail 38, and are therefore no longer sucked to the cloth, they reach a transfer mechanism indicated generally at 62 onto which they slide under gravity.

More particularly, the mechanism 62 includes a support member 64 pivotal about the point P and fitted with an adjustable counterweight 66 such that the mechanism 62 has a rest position shown in FIG. 10 ready to receive a tray 20 thereon.

Figure 11:
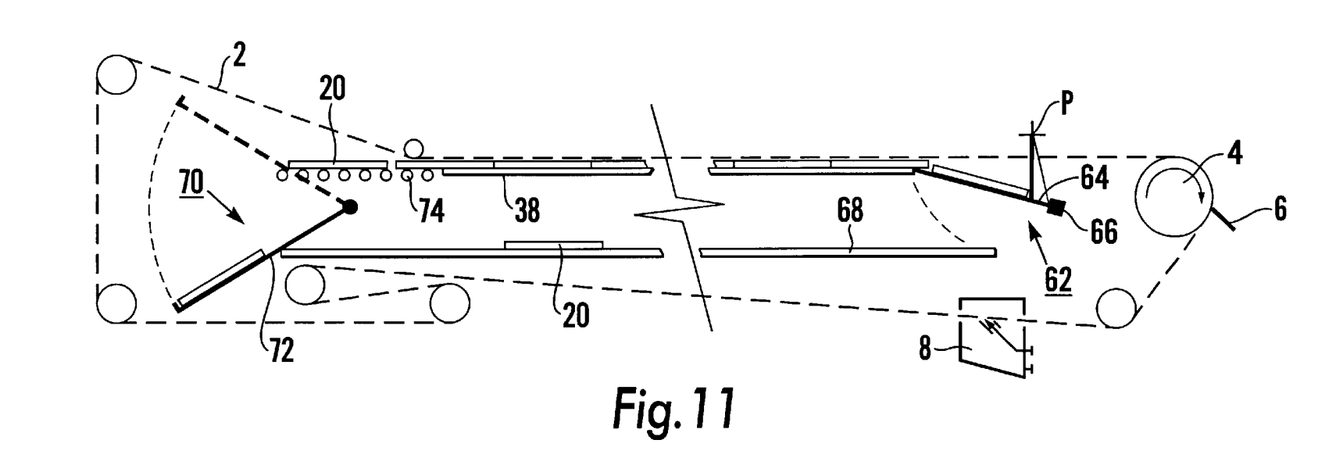
FIGS. 11 and 12 show diagrammatically the operation of a filter according to a further embodiment of the invention.
Figure 12:
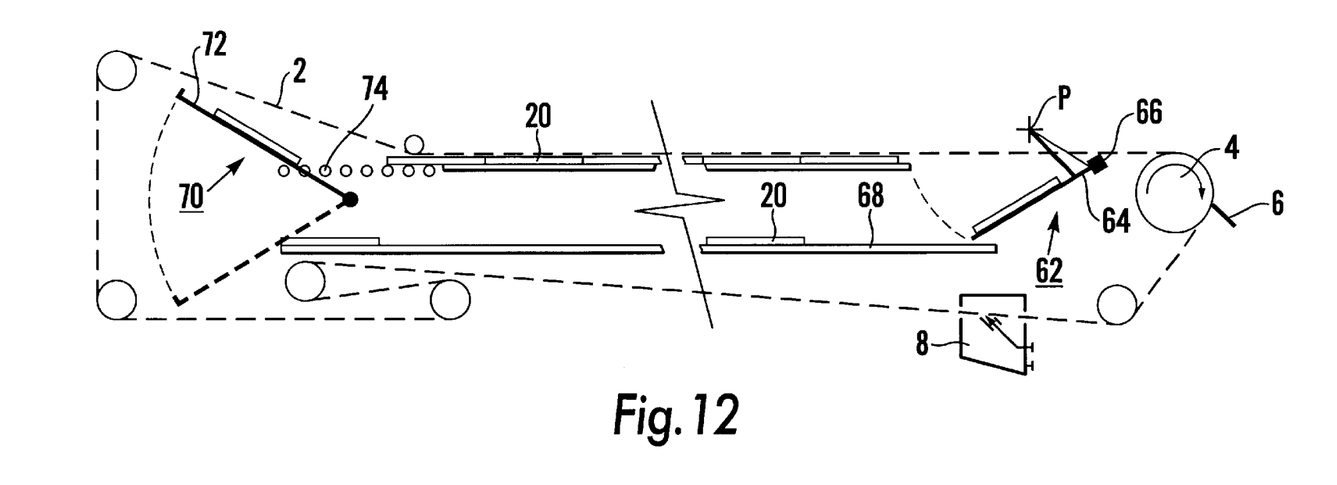

Once the tray 20 is received on the support member 64, the weight of the tray 20 pivots the member 64 about the point P to the position shown in FIG. 11. The tray 20 then slides under gravity from the support member 64 onto a directional return air slide 68. This air slide 68 is of conventional construction, incorporating inclined air jets which not only support the trays 20, but also propel them along the slide 68.

Clearly other transport means, such as a conveyor belt or a pneumatic ram, may be used to move the trays 20 from the transfer mechanism 62.

As the transfer of the trays 20 on the air slide 68 can be at a speed many times greater than the speed of travel of the belt 2, there need be only one or two trays on the return air slide 68 for every ten trays on the upper run of the belt 2.

The trays 20 are propelled by the air slide 68 towards a lifting mechanism indicated generally at 70 and including a pivotal support member 72 onto which they are fed by the air slide 68.

When a tray 20 is fully engaged on the support member 72, a sensor (not shown) is activated which, in turn, activates a locking pin (not shown) to secure the tray to the support member 72. At the same time a torsional device (not shown) pivots the support member 72 through an angle of about 60° from the position shown in FIG. 10 to that shown in FIG. 11. The locking pin is then released, allowing the tray 20 to slide under gravity onto a set of driven rollers 74, or a conveyor belt, to feed that tray 20 against a preceding tray.

The locking pin may be a mechanical device engaged by a spring and released from the tension of a cable, or may be a pneumatically or electrically operated device.

Once a tray 20 has butted against its predecessor and once it has moved onto the vacuum rail 38, the suction of the vacuum holds the tray against the cloth as previously described.

In order to ensure that there is no undue leakage between abutting trays 20, each tray 20 may be fitted with a soft and compressible gasket which, under the influence of the driven rollers 74 or conveyor belt, ensures a good joint.

Figure 13:
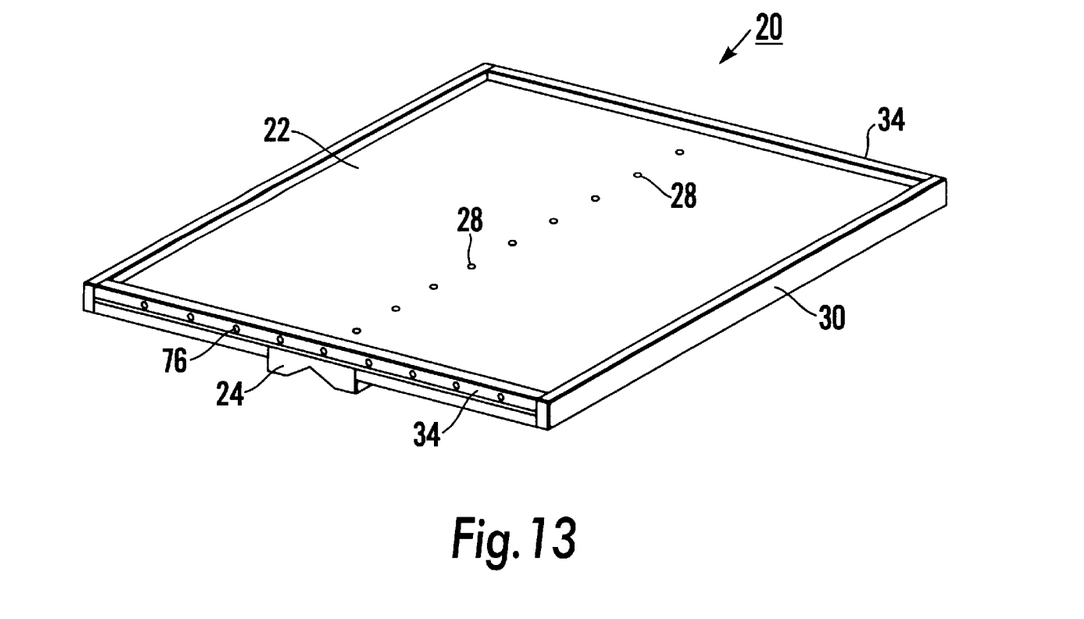
FIG. 13 is a perspective view of a suction tray of the further embodiment of the invention.
Figure 14:
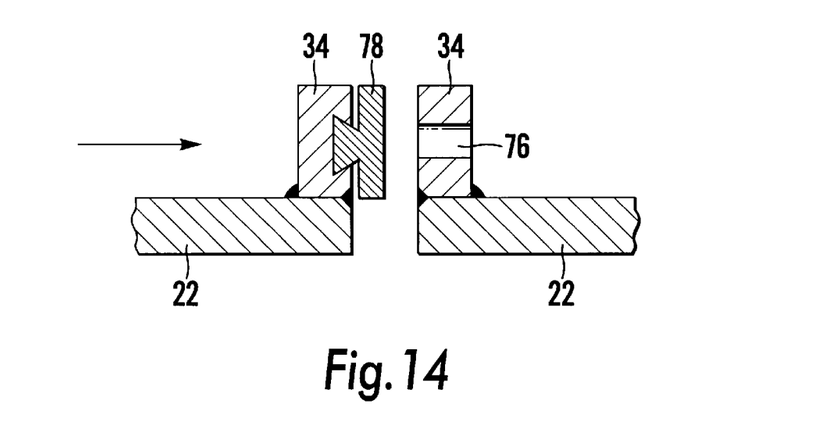
FIG. 14 is a section through the end walls of two abutting trays as shown in FIG. 13.

Alternatively the downstream end of each tray 20 may be fitted with walls 34 which are perforated at 76, and the upstream end of each tray 20 may be fitted with a soft and compressible gasket 78 which is sucked against the downstream end of the preceding tray by virtue of the perforations 76 to effect the desired seal therewith.

The construction of this further embodiment allows for a continuous belt filter without the need for flexible carrier belts, support belts of any kind, or intermittently moving suction trays, thereby resulting in a very much simpler and more economical construction than heretofore.

In the case of extremely light weight filter cloths, the trays 20 can be driven mechanically rather than being pulled by the filter cloth.

This may be achieved by means of a chain drive which picks up the trays at their starting position and releases them at the discharge end.

Figure 15:
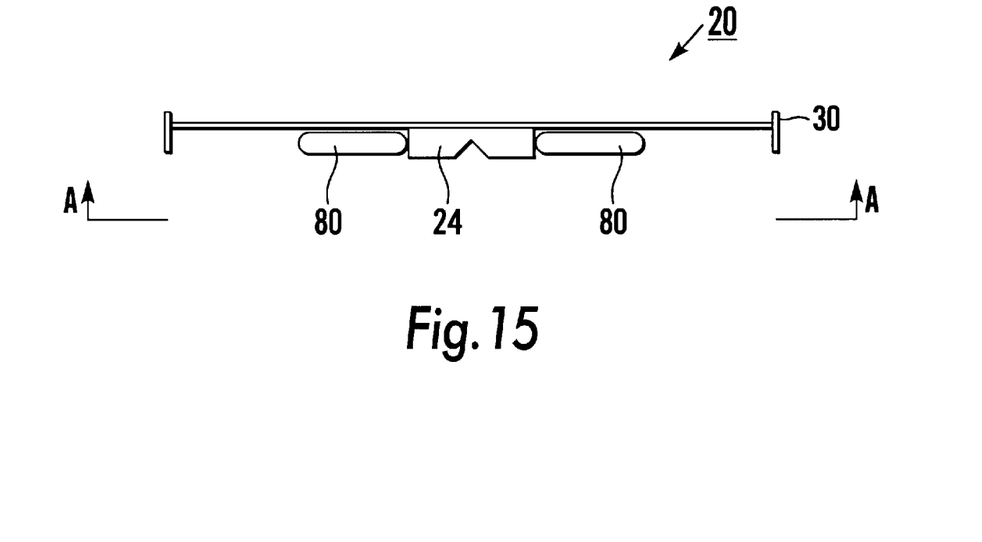
FIGS. 15 and 16 are an end view and an underneath view respectively of part of a filter according to the invention.
Figure 16:
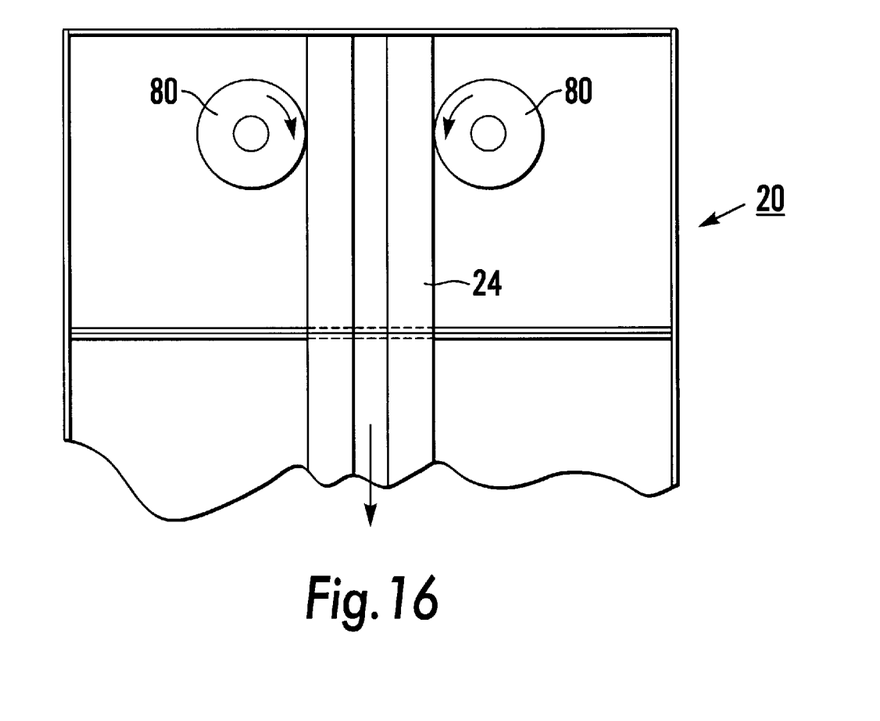

Alternatively the trays may be driven by a friction drive arrangement shown in FIGS. 15 and 16, two friction drive wheels 80 engaging against the slide blocks 24 to transport the trays 20. In this case, there is no need for a driven roller to move the belt 2.

Figure 17:
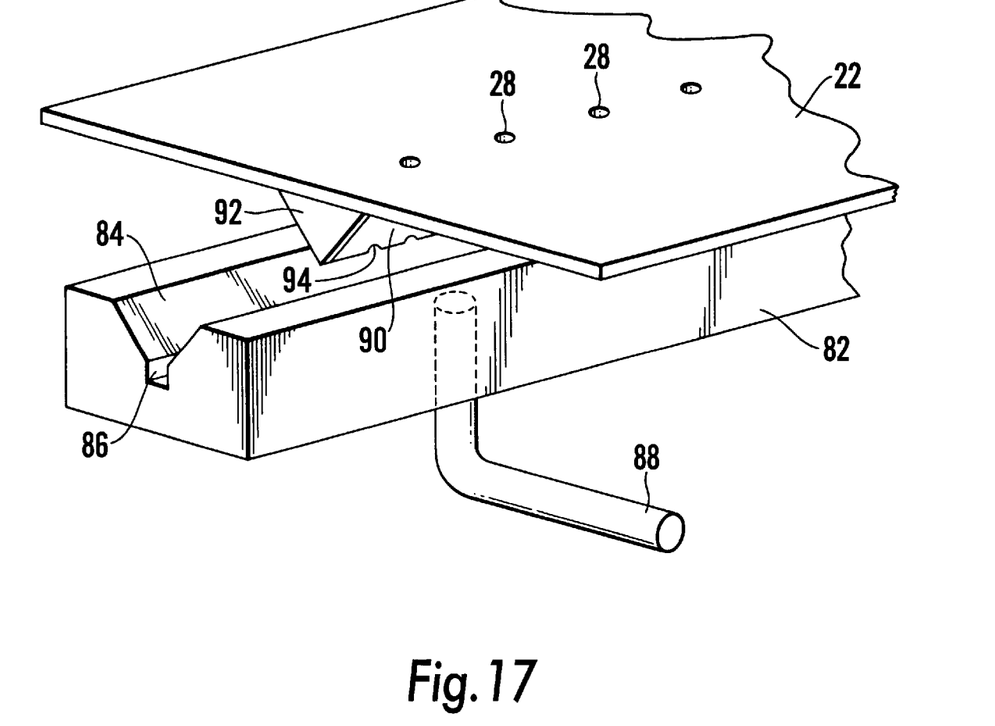
FIG. 17 is an isometric view of part of a filter tray and vacuum rail of a still further embodiment of the invention.

Referring to FIG. 17 there is shown part of a still further embodiment of the invention the principle of operation of which is the same as those detailed above but in which the configurations of the slide blocks and vacuum rail are substantially inverted or reversed.

More particularly, the vacuum rail 82 comprises an elongate block extending centrally the length of the filter, a V-shaped groove 84 being formed in the upper surface of the rail 82. A rectangular section groove 86 is formed along the base of the groove 84 to extend the length of the rail 82, a vacuum source being connected to the groove 86 by way of pipes one of which is shown at 88.

Secured to the underside of the base 22 of the tray 20 is a slide member 90 of V-shape in transverse section the ends of which are closed by plates 92 to define a hollow interior to the slide member.

A plurality of holes 94 are drilled through the base of the member 90 to communicate into the interior of the member 90, these holes 94 being typically of 10 mm diameter and on a 40 mm pitch to align with the holes 28 through the base 22 of the tray 20.

In use, the slide members 90 seat in the groove 84 in the rail 82 in a substantially airtight manner whereby the vacuum source is in communication with, and creates an under-pressure in, the hollow interiors of the slide members 90 by way of the pipes 88, the groove 86, and the holes 94, and whereby the filter cloth is drawn onto the trays 20 by suction through the holes 28.

Conveniently the ends of the grooves 84 and 86 in the rail 82 are open whereby the groove 86 acts as a drainage channel for any drips in the system.

What I claim and desire:

1. An endless belt filter for separating liquids and solids from a mixture, comprising a liquid-permeable, driven filter belt, at least one suction tray below the upper run of said belt to be movable in the direction of the belt, the at least one tray incorporating an elongate slide member on its underside extending the length of the tray, an elongate vacuum rail below the at least one suction tray and extending substantially the length of the upper run of the endless belt, said vacuum rail receiving thereon the slide member of the at least one tray whereby the at least one tray seats on, to be guided in its longitudinal movement by, said vacuum rail, and a vacuum source connected to the vacuum rail, at least one aperture extending through the at least one tray and through the associated slide member to communicate with the vacuum rail whereby an under pressure is applied to the at least one tray by the vacuum source to draw liquid from the at least one tray into the vacuum rail, the underside of the at least one tray to each side of the vacuum rail being supported by a pneumatic cushion.

2. An endless belt filter as claimed in claim 1 in which the vacuum rail is hollow and is of triangular shape in transverse section with a horizontal base, the slide member on the at least one tray comprising a slide block with an inverted V-shaped recess in its undersurface to seat on and to co-operate with the vacuum rail.

3. An endless belt filter as claimed in claim 2 in which the at least one tray has a plurality of longitudinally spaced apertures therein each extending through the base of the tray and through the slide block, the apex of the recess in the at least one slide block having a longitudinal slot therein which interconnects the apertures therethrough, the vacuum rail having a plurality of longitudinally spaced apertures therethrough communicating into the interior of the rail, the arrangement being such that the vacuum source produces an under pressure in the at least one trays by way of the apertures in the rail, the slot in the at least one slide block and the apertures in the at least one tray.

4. An endless belt filter as claimed in claim 1 in which the slide member on the at least one tray is hollow and is of V-shape in transverse section, and in which the vacuum rail has a V-shaped recess in its upper surface extending the length thereof to receive therein the slide member on the at least one tray.

5. An endless filter belt as claimed in claim 4 in which the at least one tray has a plurality of longitudinally spaced apertures therein each extending through the base of the tray to communicate into the hollow slide member, the base of the slide member having a plurality of further longitudinally spaced apertures therein, the base of the recess in the vacuum rail having a longitudinal slot therein to which the vacuum source is applied, the arrangement being such that the vacuum source produces an under pressure in the at least one tray by way of the slot in the rail, the further apertures in the at least one slide member and the apertures in the at least one tray.

6. An endless belt filter as claimed in claim 1 and comprising a plurality of elongate vacuum rails below the at least one suction tray, the at least one tray including a plurality of slide members, one to seat on each vacuum rail.

7. An endless belt filter as claimed in claim 1 in which the trays are interconnected with one another to constitute a unit which, on reaching the forward end of the upper run of the belt, is returned to a starting position adjacent the rear end of the upper run of the belt.

8. An endless belt filter as claimed in claim 1 in which the vacuum source is such that, on activation, the filter belt is sucked onto the trays whereby the trays are carried along by the filter belt to the forward end of the upper run thereof, the vacuum source then being deactivated to enable return of the trays to their starting positions.

9. An endless belt as claimed in claim 1 in which separate drive means are provided for moving the trays forward.

10. An endless belt filter as claimed in claim 1 in which there are a plurality of independent suction trays which, when they reach the forward end of the upper run of the belt, are each returned by a transport system to a starting position adjacent the rear end of the upper run of the belt.

11. An endless belt filter as claimed in claim 10 in which the transport system comprises a return mechanism below the upper run of the filter belt and moving in a direction opposite to that of said upper run, each tray, on reaching the forward end of the upper run of the filter belt, falling onto the return mechanism, the transport system further comprising a lifting mechanism which raises the trays from the return mechanism into their starting positions adjacent and below the rear end of the upper run of the filter belt.

12. An endless belt filter as claimed in claim 11 in which the transport system includes a pivotal transfer mechanism onto which each tray slides under gravity on reaching the forward end of the upper run of the filter belt, the tray subsequently sliding from said transfer mechanism under gravity onto the return mechanism.

13. An endless belt filter as claimed in claim 12 in which the return mechanism comprises an air slide in the form of a hollow, elongate rail from which emanate a plurality of inclined jets of air under pressure which serve to propel the trays therealong from the transfer mechanism to the lifting mechanism.

14. An endless belt filter as claimed in claim 10 in which the individual trays abut one another and are held against the filter belt by the under pressure applied to the trays by the vacuum source to be carried along by the filter belt, gaskets reacting between adjacent abutting ends of the trays.

15. An endless belt filter as claimed in claim 14 in which one end wall of each tray is provided with a plurality of holes therein, and the other end wall of each tray carries a gasket thereon, the under pressure in a tray serving to suck the gasket on the other end wall of the adjacent tray against the one end wall thereof by way of the holes in said one end wall.

* * * * *